United States Patent
Yang et al.

(10) Patent No.: US 9,535,196 B2
(45) Date of Patent: Jan. 3, 2017

(54) COLOR FILTER SUBSTRATE, METHOD FOR FABRICATING THE SAME, DISPLAY PANEL AND DISPLAY DEVICE

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventors: Xiaofei Yang, Beijing (CN); Haoyuan Fan, Beijing (CN); Zailong Mo, Beijing (CN); Tianlei Shi, Beijing (CN); Seungyik Park, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 44 days.

(21) Appl. No.: 14/447,999

(22) Filed: Jul. 31, 2014

(65) Prior Publication Data
US 2015/0253620 A1   Sep. 10, 2015

(30) Foreign Application Priority Data
Mar. 6, 2014 (CN) .......................... 2014 1 0080966

(51) Int. Cl.
*G02F 1/1335* (2006.01)
*G02F 1/1339* (2006.01)
*G02B 5/20* (2006.01)

(52) U.S. Cl.
CPC ......... *G02B 5/201* (2013.01); *G02F 1/133512* (2013.01); *G02F 1/133516* (2013.01); *G02F 1/13394* (2013.01); *Y10T 29/49826* (2015.01)

(58) Field of Classification Search
CPC G02F 1/1339; G02F 1/13392; G02F 1/13394; G02F 1/133512; G02F 1/133514; G02F 1/133516; G02B 5/20; G02B 5/201
See application file for complete search history.

(56) References Cited

U.S. PATENT DOCUMENTS 7,709,163 B2    5/2010  Ishigaki et al.
2008/0137022 A1*  6/2008  Komeno .............. G02F 1/1337
                                                  349/153

(Continued)

FOREIGN PATENT DOCUMENTS

CN        1427271 A1    7/2003
CN      102707352 A    10/2012
JP      2002318381 A   10/2002

OTHER PUBLICATIONS

Notification of the First Office Action dated Feb. 1, 2016 corresponding to Chinese application No. 201410080966.0.

*Primary Examiner* — Paul Lee
*Assistant Examiner* — Jia Pan
(74) *Attorney, Agent, or Firm* — Nath, Goldberg & Meyer; Joshua B. Goldberg; Christopher Thomas

(57) ABSTRACT

The embodiments of the present invention disclose a color filter substrate, a method for fabricating the same, a display panel and a display device, and relate to the field of display technology, for preventing the occurrence of a color mixture phenomenon of the display device while ensuring that the display device has high aperture ratio and resolution. The color filter substrate comprises a color filter layer which comprises color filter units with at least two colors and distributed in the form of a matrix, and a black matrix is arranged between two adjacent color filter units; the color filter substrate further comprises: light-shielding bulges located at a part of the area of the black matrix and facing towards an incident light direction, for preventing the occur- (Continued)

rence of the color mixture among the color filter units with different colors.

18 Claims, 4 Drawing Sheets

(56) References Cited

U.S. PATENT DOCUMENTS

| | | | | |
|---|---|---|---|---|
| 2009/0115954 A1* | 5/2009 | Tseng | ............ | G02F 1/13394 |
| | | | | 349/156 |
| 2011/0222016 A1* | 9/2011 | Kaneko | ............ | G02F 1/13394 |
| | | | | 349/155 |
| 2011/0299002 A1* | 12/2011 | Won | ............ | G02B 5/201 |
| | | | | 349/43 |
| 2012/0268700 A1* | 10/2012 | Shu | ............ | G03F 7/0007 |
| | | | | 349/106 |
| 2013/0342795 A1* | 12/2013 | Park | ............ | G02F 1/133512 |
| | | | | 349/110 |

* cited by examiner

--Prior Art-- forming a pattern comprising a color filter layer, black matrixes and light-shielding bulges on a base substrate, so that the color filter layer comprises color filter units with at least two colors and distributed in the form of a matrix, and the black matrix is located between two adjacent color filter units, and the light-shielding bulge is located at a part of the area of the black matrix and faces towards an incident light direction, for preventing the occurrence of the color mixture among the color filter units with different colors — S601

Fig. 6 forming a pattern of the color filter layer on the base substrate — S701 forming a layer of black photosensitive resin on the base substrate formed with the pattern of the color filter layer, and forming a pattern comprising black matrixes and light-shielding bulges simultaneously through a single patterning process, so that the light-shielding bulges project from the surface of the black matrixes — S702

Fig. 7

COLOR FILTER SUBSTRATE, METHOD FOR FABRICATING THE SAME, DISPLAY PANEL AND DISPLAY DEVICE

FIELD OF THE INVENTION

The present invention relates to the field of display technology, and particularly relates to a color filter substrate, a method for fabricating the same, a display panel and a display device.

BACKGROUND OF THE INVENTION

A display panel generally comprises an array substrate and a color filter substrate. Specifically, pixel units in an array are arranged on the array substrate, and each of the pixel units comprises a pixel electrode. Referring to FIG. 1, a color filter layer 1' is arranged on the color filter substrate, the color filter layer 1' comprises red filter units 11', green filter units 12' and blue filter units 13', and a black matrix 2' is arranged between two adjacent color filter units. A production process for the display panel comprises the steps of fabricating the array substrate, fabricating the color filter substrate, aligning and assembling the array substrate and the color filter substrate, and the like.

An alignment error is liable to occur during the alignment of the array substrate and the color filter substrate, exemplarily, as shown in FIG. 1, when the color filter substrate deflects to the right relative to the array substrate, the color filter layer 1' deflects to the right relative to the pixel electrodes 3', thus light rays (shown by full lines with arrows in FIG. 1) passing through the red filter unit 11' and the green filter unit 12' of the color filter layer 1' can be observed simultaneously from the side view angle shown in FIG. 1, that is, a color mixture phenomenon occurs in the display device.

At present, the occurrence of the color mixture phenomenon is generally avoided by means of increasing the transversal width of the black matrix 2' or increasing the space between the pixel electrodes 3' in two adjacent pixel units. The inventor found that, the aperture ratio of the display device may be reduced by increasing the transversal width of the black matrix 2'; and the resolution of the display device may be reduced by increasing the space between the pixel electrodes 3' in two adjacent pixel units.

SUMMARY OF THE INVENTION

The technical problem to be solved by the present invention is to provide a color filter substrate, a method for fabricating the same, a display panel and a display device, for preventing the occurrence of the color mixture phenomenon of the display device while ensuring that the display device has high aperture ratio and resolution.

In order to solve the technical problem above, the embodiments of the present invention provide a color filter substrate, and the following technical solution is adopted:

a color filter substrate comprises a color filter layer which comprises color filter units with at least two colors and distributed in the form of a matrix, and a black matrix being arranged between two adjacent color filter units; the color filter substrate further comprises: light-shielding bulges each of which is located at a part of the area of the black matrix and faces towards an incident light direction, for preventing the occurrence of color mixture among the color filter units with different colors.

The transversal width of the light-shielding bulge is less than or equal to the transversal width of the black matrix at the part of the area where the light-shielding bulge is located.

The longitudinal length of the light-shielding bulge is greater than or equal to the maximum longitudinal length of the color filter layer.

Optionally, the light-shielding bulge is directly formed on the black matrix, and the material of the light-shielding bulge is the same as the material of the black matrix.

Optionally, an isolation layer is arranged between the light-shielding bulge and the black matrix.

Further, the color filter substrate further comprises a spacer located on the isolation layer, and the material of the light-shielding bulge is the same as the material of the spacer.

The spacer comprises a primary spacer and a secondary spacer, the height of the primary spacer is greater than or equal to the height of the secondary spacer, and the height of the light-shielding bulge is less than or equal to the height of the secondary spacer.

Optionally, the black matrix comprises a plurality of rows of first black matrix parts and a plurality of columns of second black matrix parts, the space between two adjacent rows of first black matrix parts is greater than or equal to the space between two adjacent columns of second black matrix parts, and the light-shielding bulge is located at a part of the area of the second black matrix parts.

The material of the light-shielding bulge is lightproof.

The embodiments of the present invention provide a color filter substrate, the color filter substrate comprises a color filter layer, the color filter layer comprises color filter units with at least two colors and distributed in the form of a matrix, and a black matrix is arranged between the adjacent color filter units. The color filter substrate above further comprises light-shielding bulges each of which is located at a part of the area of the black matrix and faces towards an incident light direction, for preventing the occurrence of color mixture among the color filter units with different colors. Specifically, when alignment error exists between the array substrate and the color filter substrate, the light-shielding bulges on the color filter substrate shield the light rays which may cause a color mixture phenomenon, therefore, only one color can be observed, and then the color mixture phenomenon of the display device is prevented. In addition, the light-shielding bulge is located on the black matrix, and therefore, the aperture ratio and the resolution of the display device cannot be reduced by the arrangement of the light-shielding bulge.

The embodiments of the present invention further provide a display panel, which comprises any color filter substrate above.

The embodiments of the present invention further provide a display device, which comprises the display panel above.

In order to further solve the technical problem above, the embodiments of the present invention further provide a method for fabricating a color filter substrate, and the following technical solution is adopted:

A method for fabricating a color filter substrate comprises:

forming a pattern comprising a color filter layer, a black matrix and light-shielding bulges on a base substrate, wherein the color filter layer comprises color filter units with at least two colors and distributed in the form of a matrix;

the black matrix is arranged between two adjacent color filter units; and the light-shielding bulge is located at a part of the area of the black matrix and faces towards an incident light direction, for preventing the occurrence of color mixture among the color filter units with different colors.

The transversal width of the light-shielding bulge is less than or equal to the transversal width of the black matrix at the part of the area where the light-shielding bulge is located.

The longitudinal length of the light-shielding bulge is greater than or equal to the maximum longitudinal length of the color filter layer.

Optionally, the step of forming a pattern comprising a color filter layer, a black matrix and light-shielding bulges on a base substrate comprises:

forming a pattern of the color filter layer on the base substrate; and forming a layer of black photosensitive resin on the base substrate formed with the pattern of the color filter layer, and forming a pattern comprising the black matrix and the light-shielding bulges simultaneously through a single patterning process so that the light-shielding bulges project from the surface of the black matrix.

Optionally, the step of forming a pattern comprising a color filter layer, a black matrix and light-shielding bulges on a base substrate comprises:

forming a pattern of the black matrix;

forming a pattern of the color filter layer;

forming an isolation layer on the base substrate formed with the patterns of the color filter layer and the black matrix; and forming a pattern comprising the light-shielding bulges on the isolation layer.

Further, the step of forming a pattern comprising the light-shielding bulges on the isolation layer comprises:

forming a layer of lightproof photosensitive resin material on the isolation layer forming a pattern comprising the light-shielding bulges and spacers simultaneously through a single patterning process.

Further, the step of forming a layer of lightproof photosensitive resin material on the isolation layer forming a pattern comprising the light-shielding bulges and the spacers simultaneously through a single patterning process comprises:

forming a layer of lightproof photosensitive resin material on the isolation layer, and forming a pattern comprising the light-shielding bulges, primary spacers and secondary spacers simultaneously through a single patterning process, so that the height of the primary spacer is greater than or equal to the height of the secondary spacer, and the height of the light-shielding bulge is less than or equal to the height of the secondary spacer.

Optionally, the step of forming a pattern comprising a color filter layer, a black matrix and light-shielding bulges on a base substrate comprises:

forming a pattern of the black matrix on the substrate, wherein the black matrix comprises a plurality of rows of first black matrix parts and a plurality of columns of second black matrix parts, and the space between two adjacent rows of first black matrix parts is greater than or equal to the space between two adjacent columns of second black matrix parts; and forming a pattern of the light-shielding bulges at a part of the area of the second black matrix parts.

In this case, the light-shielding bulge is prepared from a lightproof material.

The embodiments of the present invention provide a method for fabricating a color filter substrate, and the method comprises forming a pattern comprising the color filter layer, the black matrix and the light-shielding bulges on the base substrate, wherein the color filter layer comprises color filter units with at least two colors and distributed in the form of a matrix, the black matrix is arranged between the adjacent color filter units, and the light-shielding bulge is located at a part of the area of the black matrix and faces towards an incident light direction, for preventing the occurrence of the color mixture among the color filter units with different colors. Specifically, when the alignment error exists between the array substrate and the color filter substrate, the light-shielding bulges on the color filter substrate block the light rays which cause the color mixture phenomenon, therefore, only one color can be observed, and then the color mixture phenomenon of the display device is prevented. In addition, as the light-shielding bulge is located on the black matrix, and therefore, the aperture ratio and the resolution of the display device cannot be reduced by the arrangement of the light-shielding bulge.

BRIEF DESCRIPTION OF THE DRAWINGS

In order to illustrate the technical solution in the embodiments of the present invention or the prior art more clearly, accompanying drawings which are needed in descriptions of the embodiments or the prior art will be simply introduced below. Obviously, the accompanying drawings in the description below are merely part of embodiments of the present invention, based on which other drawings may also be obtained by those of ordinary skill in the art without any creative effort.

FIG. 6 is a flow diagram of a method for fabricating a color filter substrate in the embodiments of the present invention;

FIG. 7 is a flow diagram of forming a pattern comprising a color filter layer, a black matrix and a light-shielding bulge on a base substrate in a specific embodiment of the present invention.

DETAILED DESCRIPTION OF THE EMBODIMENTS

The technical solution in the embodiments of the present invention will be clearly and completely described below in combination with the accompanying drawings in the embodiments of the present invention. Obviously, the described embodiments are only part of embodiments of the present invention but not all of them. Based upon the embodiments in the present invention, all the other embodiments that are acquired by those ordinary skilled in this art without any creative efforts shall be still within the protection scope of the present invention.

Embodiment I

Figure 1:
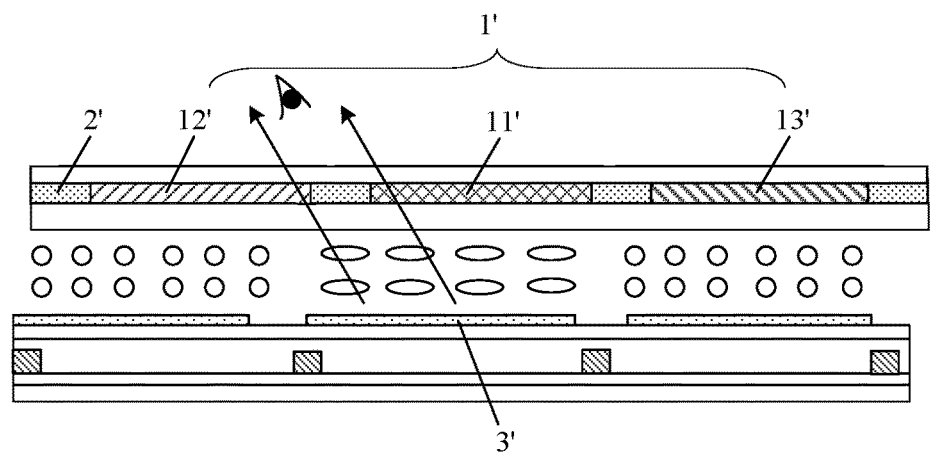
FIG. 1 is a schematic diagram of a color filter substrate and an array substrate with an alignment error therebetween, of a display panel in the prior art.
Figure 2:
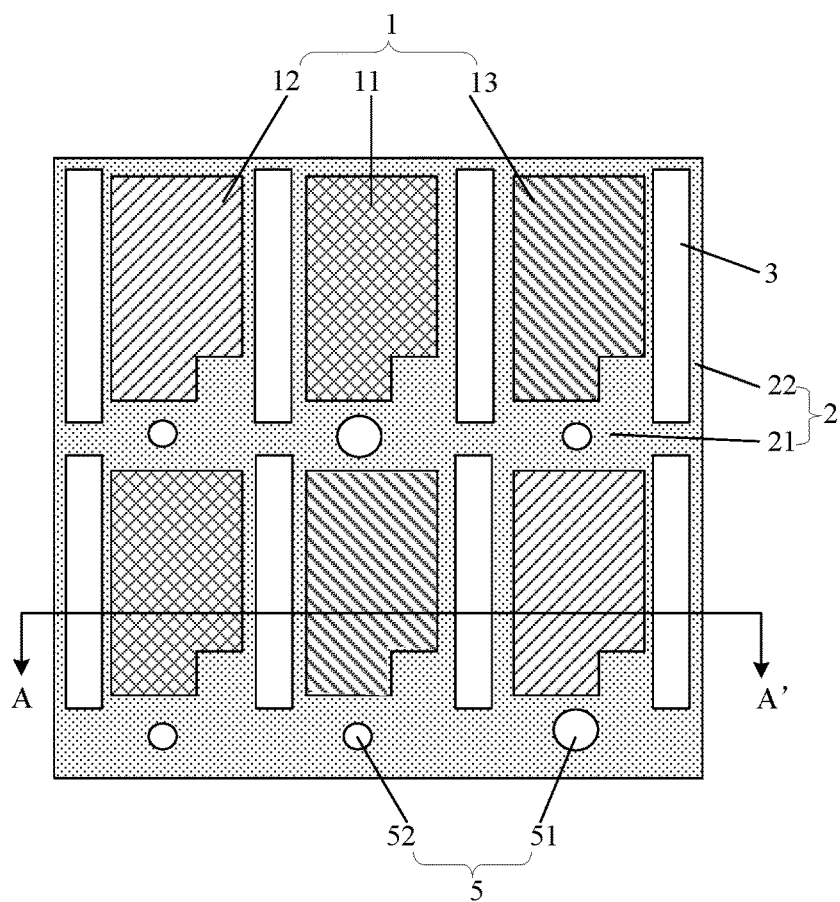
FIG. 2 is a planar schematic diagram of a first color filter substrate in embodiments of the present invention.
Figure 3:
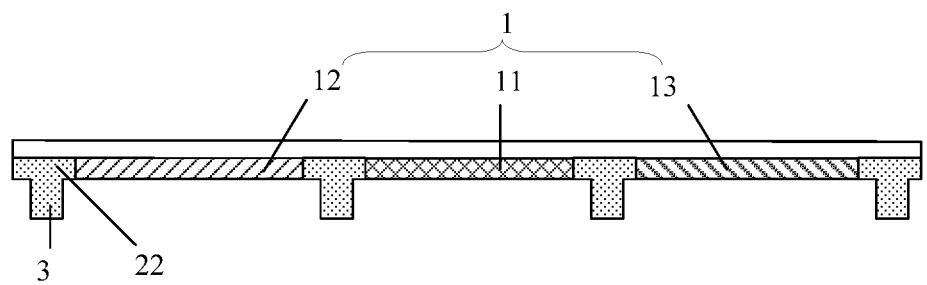
FIG. 3 is a schematic diagram of the A-A' section of a color filter substrate shown in FIG. 2 in the embodiments of the present invention.

The embodiment of the present invention provides a color filter substrate as shown in FIG. 2 and FIG. 3.

The color filter substrate comprises a color filter layer 1, the color filter layer comprises color filter units with at least two colors and distributed in the form of a matrix, and a black matrix 2 is arranged between the adjacent color filter units. Specifically, as shown in FIG. 2 and FIG. 3, the color filter layer 1 comprises red filter units 11, green filter units 12 and blue filter units 13. The materials of the color filter units with different colors of the color filter layer 1 are generally color photosensitive resin with the corresponding colors.

Further, the color filter substrate further comprises light-shielding bulges 3 each of which is located at a part of the area of the black matrix 2, for preventing the occurrence of the color mixture among the color filter units with different colors.

In addition, as shown in FIG. 2, the black matrix 2 comprises a plurality of rows of transversally-arranged first black matrix parts 21 for shielding gate lines on the array substrate, and a plurality of columns of longitudinally-arranged second black matrix parts 22 for shielding data lines on the array substrate, however, the black matrix 2 is not limited to only comprising the first black matrix parts 21 and the second black matrix parts 22, and may also comprise parts (not shown in FIG. 2) for shielding thin film transistors on the array substrate. The space between two adjacent rows of the first black matrix parts 21 is generally greater than or equal to the space between two adjacent columns of the second black matrix parts 22. The color mixture phenomenon observed by human eyes is generally caused by the following reasons: during side view observation, light rays penetrating through the same pixel on the array substrate penetrates through the two adjacent transversally-arranged filter units with different colors and then enter human eyes, therefore, the light-shielding bulge 3 may be arranged only at a part of area where the second black matrix parts 22 are located, thus saving materials. Of course, division for the black matrix 2 is not limited to the mode above, and a person skilled in the art may select according to actual conditions.

It should be noted that, the light-shielding bulge 3 needs to be made from a lightproof material, and the specific material may be selected according to actual conditions. The height of the light-shielding bulge 3 may be set according to a cell thickness obtained after alignment and assemble of the color filter substrate and the array substrate and the requirements of different products, as long as the color mixture phenomenon still can not be observed at the maximum side view angle, and the embodiments of the present invention are not limited thereto.

Optionally, the transversal width of the light-shielding bulge 3 is less than or equal to the transversal width of the black matrix 2 at the part of the area where the light-shielding bulge is located, thus the aperture ratio and the resolution of the display device cannot be reduced. As shown in FIG. 3, the transversal width of the light-shielding bulge 3 is less than the transversal width of the second black matrix part 22 where the light-shielding bulge is located.

Optionally, the longitudinal length of the light-shielding bulge 3 is greater than or equal to the maximum longitudinal length of the color filter layer 1, thus the light-shielding bulge has the optimal light-shielding effect.

Further, the material of the black matrix 2 generally is black photosensitive resin, therefore, as shown in FIG. 3, the light-shielding bulge 3 may be directly formed on the black matrix 2, and the material of the light-shielding bulge 3 is the same as the material of the black matrix 2. Exemplarily, the section of the integrally-formed light-shielding bulge 3 and the black matrix 2 may be in the shape of Chinese character "凸". Preferably, the light-shielding bulge 3 and the black matrix 2 are integrally formed by a single patterning process. In this case, the color filter substrate may also comprise structures such as a transparent protection layer, a common electrode or a spacer or the like which are located on the black matrix 2 and the light-shielding bulge 3, and the embodiments of the present invention are not limited thereto.

Figure 4:
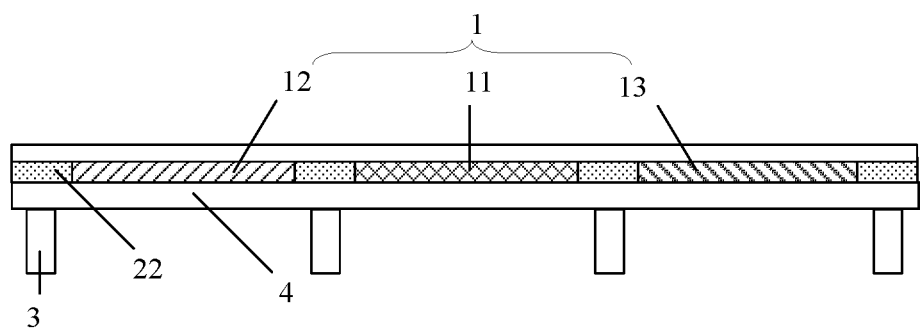
FIG. 4 is a schematic diagram of the section of a second color filter substrate in the embodiments of the present invention.

In addition, as shown in FIG. 4, the light-shielding bulge 3 and the black matrix 2 may also be mutually independent, and an isolation layer 4 is arranged between the light-shielding bulge 3 and the black matrix 2. Specifically, when the color filter substrate is applied to the traditional twisted nematic liquid crystal display (TN LCD for short), the isolation layer 4 may be a common electrode, of course, or may be other film layers, and the embodiments of the present invention are not limited thereto. When the color filter substrate is applied to an advanced super dimension switch thin film transistor liquid crystal display (ADS TFT-LCD for short), the isolation layer 4 is generally a transparent protection layer.

Further, when the color filter substrate further comprises a spacer 5 (not shown in FIG. 4) playing a role of supporting and located on the isolation layer 4, preferably, the material of the light-shielding bulge 3 is the same as the material of the spacer 5, that is, a lightproof resin material, so as to achieve the purpose of simplifying the production process.

Further, in order to realize a better support effect, as shown in FIG. 2, the spacer 5 may also comprise a primary spacer 51 and a secondary spacer 52, preferably, the height of the primary spacer 51 is greater than or equal to the height of the secondary spacer 52. In order to enable the light-shielding bulge 3 to have the optimal light-shielding effect, and be free from influence on the diffusion of liquid crystal molecules, in the embodiments of the present invention, the height of the light-shielding bulge 3 is preferably less than or equal to the height of the secondary spacer 52. When the secondary spacer 52 and the primary spacer 51 are the same in height, the secondary spacer 52 and the primary spacer 51 are in contact with areas with different heights on the array substrate, respectively, thus realizing different support effects.

Figure 5:
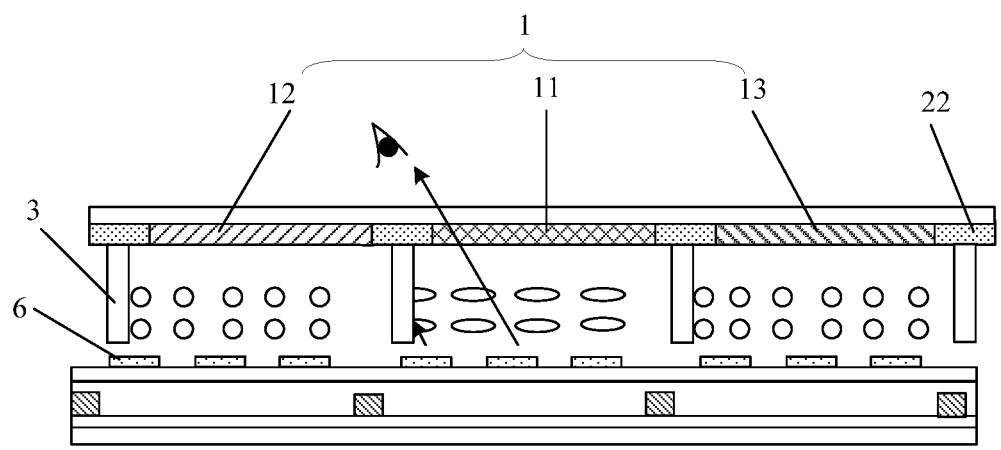
FIG. 5 is a schematic diagram of a color filter substrate and an array substrate with an alignment error, of an ADS TFT-LCD (advanced super dimension switch thin film transistor-liquid crystal display) in the embodiments of the present invention.

The advantages of the color filter substrate with the structure above are analyzed in details below in combination with the specific application examples. When the color filter substrate is applied to an ADS TFT-LCD, both a common electrode and a pixel electrode in the ADS TFT-LCD are located on the array substrate, wherein the common electrode is a plate-shaped electrode, a slit is formed on the pixel electrode, the pixel electrode and the common electrode form a multi-dimensional electric field, thus liquid crystal molecules may deflect. As shown in FIG. 5, when the color filter substrate deflects to the right relative to the array substrate, the color filter layer 1 deflects to the right relative to the pixel electrodes 6, thus the liquid crystal molecules below the second black matrix parts 22 between the red filter unit 11 and the green filter unit 12 in FIG. 5 also deflect, thus the corresponding part of light rays below the second black matrix parts 22 also passes through, when there is no light-shielding bulge 3 is arranged on the color filter substrate, it can be observed from the shown side view angle in FIG. 5 that the part of light rays passes through the green filter unit 12, thus the color mixture phenomenon occurs in the display panel, however, when the light-shielding bulge 3 is arranged on the color filter substrate, the part of light rays is shielded by the light-shielding bulge 3 and cannot pass through the green filter unit 12, and then the light rays passing through the red filter unit 11 can only be observed from the side view angle shown in FIG. 5, thus the color mixture phenomenon of the display panel can be effectively prevented.

The embodiments of the present invention provide a color filter substrate, the color filter substrate comprises a color filter layer, the color filter layer comprises color filter units with at least two colors and distributed in the form of a matrix, and a black matrix is arranged between two adjacent color filter units. The color filter substrate above further comprises a light-shielding bulge located at a part of the area of the black matrix and facing towards an incident light direction, for preventing the occurrence of color mixture among the color filter units with different colors. Specifically, when alignment error exists between the array substrate and the color filter substrate, the light-shielding bulge on the color filter substrate shields the light rays which may cause the color mixture phenomenon, therefore, only one color can be observed, and then the color mixture phenomenon of the display device is prevented. Meanwhile, the light-shielding bulge is located on the black matrix, therefore, the aperture ratio and the resolution of the display device cannot be reduced by the arrangement of the light-shielding bulge.

The embodiments of the present invention further provide a display panel, and the display panel comprises any color filter substrate above.

The embodiment of the present invention further provides a display device, which comprises the display panel above. The display device may be any products or components with a display function, such as a liquid crystal panel, electronic paper, an OLED (organic light emitting diode) panel, a mobile phone, a tablet computer, a television, a display, a notebook computer, a digital photo frame and a navigator.

Embodiment II

The embodiment of the present invention further provides a method for fabricating a color filter substrate, as shown in FIG. 6, the method comprises:

Step S601, forming a pattern comprising a color filter layer, a black matrix and a light-shielding bulges on the base substrate.

The method for fabricating the color filter substrate provided by the present invention will be described below in combination with FIG. 2. FIG. 3 and FIG. 4.

The color filter layer 1 comprises color filter units with at least two colors and distributed in the form of a matrix.

The black matrix 2 is arranged between the adjacent color filter units.

The light-shielding bulge 3 is located at a part of the area of the black matrix 2 and faces towards an incident light direction, for preventing the occurrence of the color mixture among the color filter units with different colors.

Optionally, the transversal width of the light-shielding bulge 3 is less than or equal to the transversal width of the black matrix at the part of the area where the light-shielding bulge is located.

Optionally, the longitudinal length of the light-shielding bulge 3 is greater than or equal to the maximum longitudinal length of the color filter layer 1.

Further, when the light-shielding bulge 3 is directly formed on the black matrix 2, the forming a pattern comprising a color filter layer, a black matrix and a light-shielding bulge on the base substrate described in step S601 specifically comprises the steps shown in FIG. 7:

Step S701, forming the pattern of the color filter layer on the base substrate.

Generally, the color filter layer 1 comprises red filter units 11, green filter units 12 and blue filter units 13. Therefore, the pattern of the color filter layer 1 needs to be formed by three patterning processes. Exemplarily, the red filter units 11 are formed at first: a layer of a red photosensitive resin material is coated on the base substrate, and the red filter units 11 are obtained through a single patterning process; then the green filter units 12 are formed: a layer of a green photosensitive resin material is coated on the base substrate, and the green filter units 12 are obtained through a single patterning process; and finally the blue filter units 13 are formed: a layer of a blue photosensitive resin material is coated on the base substrate, and the blue filter units 13 are obtained through a single patterning process. The pattern of the color filter layer 1 is formed on the base substrate after the above processes.

Step S702, forming a layer of black photosensitive resin on the base substrate formed with the pattern of the color filter layer, and forming a pattern comprising the black matrix and the light-shielding bulge simultaneously through a single patterning process, so that the light-shielding bulges project from the surface of the black matrix.

Specifically, the pattern comprising the black matrix 2 and the light-shielding bulge 3 may be formed simultaneously on the base substrate by means of ink-jet printing, a pigment dispersion method, printing and the like. Exemplarily, a layer of black photosensitive resin is coated at first. Then the pattern comprising the black matrix 2 and the light-shielding bulge 3 is formed simultaneously on the base substrate through a single patterning process, thus the light-shielding bulge 3 and the black matrix 2 are integrally formed.

On the basis of the steps above, the method for fabricating the color filter substrate may also comprise a step of forming a transparent protection layer, a common electrode or a spacer or the like on the pattern of the formed black matrix 2 and the light-shielding bulge 3, which are not described redundantly by the embodiment of the present invention.

Figure 8:
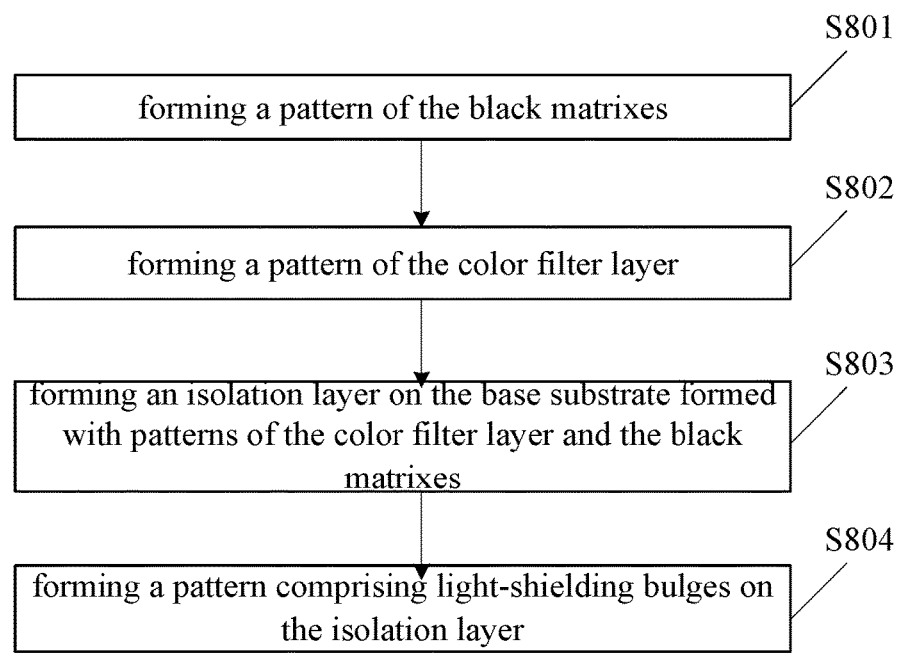
FIG. 8 is a flow diagram of forming a pattern comprising a color filter layer, a black matrix and a light-shielding bulge on a base substrate in another specific embodiment of the present invention.

When the formed light-shielding bulge 3 and the black matrix 2 are mutually independent, the forming a pattern comprising a color filter layer, a black matrix and light-shielding bulges on the base substrate described in step S601 specifically comprises the steps as shown in FIG. 8:

Step S801, forming the pattern of the black matrix; and

Step S802, forming the pattern of the color filter layer.

It should be noted that, the pattern of the color filter layer 1 may be formed on the base substrate at first, and then the pattern of the black matrix 2 is formed, or the pattern of the black matrix 2 may be formed at first, and then the pattern of the color filter layer 1 is formed, and the embodiment of the present invention is not limited thereto.

Step S803, forming an isolation layer on the base substrate formed with the patterns of the color filter layer and the black matrix.

Specifically, when the color filter substrate is applied to a traditional twisted nematic liquid crystal display (TN LCD for short), the isolation layer 4 is a common electrode, and of course, may be other film layer structures, and the embodiment of the present invention is not limited thereto. Exemplarily, when the isolation layer 4 is a common electrode, the isolation layer 4 may be formed on the base substrate formed with the patterns of the color filter layer and the black matrix by means of sputtering and the like. When the color filter substrate is applied to an advanced super dimension switch thin film transistor liquid crystal display (ADS TFT-LCD for short), the isolation layer 4 is a transparent protection layer. Exemplarily, when the isolation layer 4 is a transparent protection layer, the isolation layer 4 may be formed by coating a layer of transparent resin on the base substrate formed with the patterns of the color filter layer 1 and the black matrix 2.

Step S804, forming a pattern comprising the light-shielding bulges on the isolation layer.

Firstly, a layer of lightproof photosensitive resin material is formed on the isolation layer 4, and a pattern comprising the light-shielding bulges 3 is formed on the isolation layer 4 through a single patterning process.

Further, when the color filter substrate further comprises spacers 5, in order to simplify the production process, step S804 specifically comprises:

forming a layer of lightproof photosensitive resin material on the isolation layer 4, and forming a pattern comprising the light-shielding bulges 3 and the spacers 5 simultaneously through a single patterning process.

Further, when the spacer 5 comprises a primary spacer 51 and a secondary spacer 52, and the step above specifically comprises:

forming a layer of lightproof photosensitive resin material on the isolation layer 4, and forming a pattern comprising the light-shielding bulges 3, the primary spacers 51 and the secondary spacers 52 simultaneously through a single patterning process, so that the height of the primary spacer 51 is greater than or equal to the height of the secondary spacer 52, and the height of the light-shielding bulge 3 is less than or equal to the height of the secondary spacer 52. In this patterning process, an area corresponding to the pattern of the primary spacers 51 on the used mask plate is high in light transmittance, and an area corresponding to the pattern of the secondary spacer 52 on the used mask plate is low in light transmittance, thus the primary spacer and the secondary spacer with different heights may be formed in a single patterning process. When the height of the secondary spacer 52 is the same as that of the primary spacer 51, the secondary spacer and primary spacer are in contact with areas with different heights on the array substrate, respectively, thus realizing different support effects.

Optionally, the color mixture phenomenon observed by human eyes is generally caused by the two adjacent filter units with different colors in a horizontal direction, in order to save materials, the step of forming a pattern comprising a color filter layer, a black matrix and light-shielding bulges on the base substrate of step S601 comprises:

forming the pattern of the black matrix 2 on the base substrate, wherein the black matrix 2 comprises a plurality of rows of transversally-arranged first black matrix parts 21 and a plurality of columns of longitudinally-arranged second black matrix parts 22, the space between two adjacent rows of the first black matrix parts 21 is greater than or equal to the space between two adjacent columns of the second black matrix parts 22; and forming the pattern of the light-shielding bulge 3 at a part of the area of the second black matrix part 22.

The embodiment of the present invention provides a method for fabricating a color filter substrate, and the method comprises a step of forming a pattern comprising a color filter layer, a black matrix and light-shielding bulges on the base substrate, wherein the color filter layer comprises color filter units with at least two colors and distributed in the form of a matrix, a black matrix is arranged between two adjacent color filter units, and a light-shielding bulge is located at a part of the area of the black matrix and faces towards an incident light direction, for preventing the occurrence of the color mixture among the color filter units with different colors. Specifically, when the alignment error exists between the array substrate and the color filter substrate, the light-shielding bulges on the color filter substrate shield the light rays which may cause the color mixture phenomenon, therefore, only one expected color can be observed, and then the color mixture phenomenon of the display device is prevented. Meanwhile, the light-shielding bulge is located on the black matrix, therefore, the aperture ratio and the resolution of the display device cannot be reduced by the arrangement of the light-shielding bulge.

The foregoing descriptions are merely specific implementations of the present invention, but the protection scope of the present invention is not limited thereto. Variations or substitutions readily conceived by any skilled one familiar with this art within the technical scope disclosed by the present invention shall be encompassed within the protection scope of the present invention. Therefore, the protection scope of the claims should be subjected to the protection scope of the present invention.

The invention claimed is:

1. A color filter substrate, comprising a color filter layer which comprises color filter units with at least two colors and distributed in the form of a matrix, and a black matrix being arranged between two adjacent color filter units, wherein the color filter substrate further comprises: light-shielding bulges each of which is located at a part of the area of the black matrix and faces towards an incident light direction and projects from the surface of the color filter layer, for preventing the occurrence of the color mixture among the color filter units with different colors;

wherein the longitudinal length of the light-shielding bulge is greater than or equal to the maximum longitudinal length of the color filter layer;

wherein the light-shielding bulge is an integral structure extending along the longitudinal length of the color filter layer.

2. The color filter substrate according to claim 1, wherein the transversal width of the light-shielding bulge is less than or equal to the transversal width of the black matrix at the part of the area where the light-shielding bulge is located.

3. The color filter substrate according to claim 1, wherein the light-shielding bulge is directly formed on the black matrix, and the material of the light-shielding bulge is the same as the material of the black matrix.

4. The color filter substrate according to claim 1, wherein an isolation layer is arranged between the light-shielding bulge and the black matrix.

5. The color filter substrate according to claim 4, further comprising a spacer located on the isolation layer, wherein the material of the light-shielding bulge is the same as the material of the spacer.

6. The color filter substrate according to claim 5, wherein the spacer comprises a primary spacer and a secondary spacer, the height of the primary spacer is greater than or equal to the height of the secondary spacer, and the height of the light-shielding bulge is less than or equal to the height of the secondary spacer.

7. The color filter substrate according to claim 1, wherein the black matrix comprises a plurality of rows of first black matrix parts and a plurality of columns of second black matrix parts, the space between two adjacent rows of first black matrix parts is greater than or equal to the space between two adjacent columns of second black matrix parts, and the light-shielding bulge is located at a part of the area of the plurality of columns of second black matrix parts.

8. The color filter substrate according to claim 1, wherein the material of the light-shielding bulge is lightproof.

9. A display panel, comprising the color filter substrate according to claim 1.

10. A display device, comprising the display panel according to claim 9.

11. A method for fabricating a color filter substrate, comprising:
    forming a pattern comprising a color filter layer, a black matrix and light-shielding bulges on a base substrate, wherein
    the color filter layer comprises color filter units with at least two colors and distributed in the form of a matrix;
    the black matrix is arranged between two adjacent color filter units; and
    the light-shielding bulge is located at a part of the area of the black matrix and faces towards an incident light direction and projects from the surface of the color filter layer, for preventing the occurrence of color mixture among the color filter units with different colors;
    wherein the longitudinal length of the light-shielding bulge is greater than or equal to the maximum longitudinal length of the color filter layer;
    wherein the light-shielding bulge is an integral structure extending along the longitudinal length of the color filter layer.

12. The method for fabricating the color filter substrate according to claim 11, wherein the transversal width of the light-shielding bulge is less than or equal to the transversal width of the black matrix at the part of the area where the light-shielding bulge is located.

13. The method for fabricating the color filter substrate according to claim 11, wherein the step of forming a pattern comprising a color filter layer, a black matrix and light-shielding bulges on a base substrate comprises:
    forming a pattern of the color filter layer on the base substrate; and
    forming a layer of black photosensitive resin on the base substrate formed with the pattern of the color filter layer, and forming a pattern comprising the black matrix and the light-shielding bulges simultaneously through a single patterning process, so that the light-shielding bulges project from the surface of the black matrix.

14. The method for fabricating the color filter substrate according to claim 11, wherein the step of forming a pattern comprising a color filter layer, a black matrix and light-shielding bulges on a base substrate comprises:
    forming a pattern of the black matrix;
    forming a pattern of the color filter layer;
    forming an isolation layer on the base substrate formed with the patterns of the color filter layer and the black matrix; and
    forming a pattern comprising the light-shielding bulges on the isolation layer.

15. The method for fabricating the color filter substrate according to claim 14, wherein the step of forming a pattern comprising the light-shielding bulges on the isolation layer comprises:
    forming a layer of lightproof photosensitive resin material on the isolation layer and forming a pattern comprising the light-shielding bulges and spacers simultaneously through a single patterning process.

16. The method for fabricating the color filter substrate according to claim 15, wherein the step of forming a layer of lightproof photosensitive resin material on the isolation layer and forming a pattern comprising the light-shielding bulges and the spacers simultaneously through a single patterning process comprises:
    forming a layer of lightproof photosensitive resin material on the isolation layer, and forming a pattern comprising the light-shielding bulges, primary spacers and secondary spacers simultaneously through a single patterning process, so that the height of the primary spacer is be greater than or equal to the height of the secondary spacer, and the height of the light-shielding bulge is less than or equal to the height of the secondary spacer.

17. The method for fabricating the color filter substrate according to claim 11, wherein the step of forming a pattern comprising a color filter layer, a black matrix and light-shielding bulges on a base substrate comprises:
    forming a pattern of the black matrix on the base substrate, wherein the black matrix comprises a plurality of rows of first black matrix parts and a plurality of columns of second black matrix parts, and the space between two adjacent rows of first black matrix parts is greater than or equal to the space between two adjacent columns of second black matrix parts; and
    forming a pattern of the light-shielding bulges at a part of the area of the second black matrix parts.

18. The method for fabricating the color filter substrate according to claim 11, wherein the light-shielding bulge is prepared from a lightproof material.

* * * * *